United States Patent [19]
Craig et al.

[11] 4,013,399
[45] Mar. 22, 1977

[54] REDUCTION OF GASEOUS POLLUTANTS IN COMBUSTION FLUE GAS

[75] Inventors: Glenn D. Craig, Menomonee Falls; David T. Feuling, Milwaukee, both of Wis.; Paul G. LeHaye, Cape Elizabeth, Maine

[73] Assignee: Aqua-Chem, Inc., Milwaukee, Wis.

[22] Filed: Oct. 9, 1975

[21] Appl. No.: 620,954

Related U.S. Application Data

[62] Division of Ser. No. 488,057, July 12, 1974, Pat. No. 3,955,907, which is a division of Ser. No. 295,249, Oct. 5, 1972, Pat. No. 3,837,788.

[52] U.S. Cl. ............................ 431/351; 431/10; 431/160; 431/165
[51] Int. Cl.² ........................................ F23L 9/00
[58] Field of Search ............ 431/351, 352, 10, 160, 431/165

[56] References Cited
UNITED STATES PATENTS

| | | |
|---|---|---|
| 2,569,446 | 10/1951 | Bonvillian et al. ............ 431/351 X |
| 2,570,554 | 10/1951 | Henwood ...................... 431/160 X |
| 3,182,708 | 5/1965 | Mozzi et al. ................... 431/352 X |
| 3,291,182 | 12/1966 | Dow et al. ..................... 431/10 X |

*Primary Examiner*—Edward G. Favors
*Attorney, Agent, or Firm*—Fred Wiviott

[57] ABSTRACT

Fuel is burned in a primary combustion chamber with less than the air required for stoichiometric combustion so that the combustion gases have a high carbon monoxide (CO) and hydrocarbon content and the temperature of the gases is held below that at which significant nitrogen oxides ($NO_x$) would be produced. The combustion gases are then passed through a secondary combustion zone in which more air is injected into the gas stream to oxidize the CO and hydrocarbons to carbon dioxide ($CO_2$). The secondary burner comprises a plurality of foraminous tubes through which secondary air is emitted. Combustion in the secondary zone is maintained at a temperature below that at which nitrogen oxides ($NO_x$) will be produced in significant quantities.

29 Claims, 7 Drawing Figures

REDUCTION OF GASEOUS POLLUTANTS IN COMBUSTION FLUE GAS

This is a division of application Ser. No. 488,057, filed July 12, 1974, now U.S. Pat. No. 3,955,907 which in turn is a division of application Ser. No. 295,249 filed Oct. 5, 1972, now U.S. Pat. No. 3,837,788.

BACKGROUND OF THE INVENTION

Oxides of nitrogen and carbon monoxide are gaseous pollutant products of the combustion of hydrocarbon fuels. As pollution control standards become more stringent, the reduction or elimination of these products becomes a serious problem.

SUMMARY OF THE INVENTION

The invention comprises a combustion method and apparatus which is characterized by burning carbonaceous or hydrocarbon fuel in a primary combustion zone with less than the stoichiometric amount of air required for complete combustion. Generally up to about 75 or 80% of the stoichiometric amount is supplied to the primary zone. Incomplete combustion results in the temperature of the combustion gases remaining below 2700° F, a temperature above which significant quantities of $NO_x$ would be produced. Incomplete combustion in the primary zone results in the gaseous combustion products containing a high percentage of CO, unburned hydrocarbons and carbonaceous materials. All of the hot gases from the primary zone are then passed through a secondary combustion zone where air is injected in the gas stream for oxidizing the CO, unburned hydrocarbons and carbonaceous materials to innocuous $CO_2$ under such conditions that a temperature is never exceeded at which nitrogen from the air or from the fuel might be oxidized to $NO_x$ in significant quantities.

The secondary combustion zone includes a plurality of foraminous tubes over which the gaseous combustion products exiting the primary combustion zone are constrained to pass. Air at positive pressure is fed into the tubes from any suitable source. The tubes have foramina of some kind such as pores or perforations for emitting air into the gaseous combustion product stream. The secondary air mixes with the gases to support a low temperature combustion process which oxidizes the CO, unburned hydrocarbons and carbonaceous materials to $CO_2$ under temperature conditions which minimize production of $NO_x$.

The invention is further characterized by controlling the total air required for combustion of the fuel at prevailing feed rates in the usual way. More specifically, a primary damper is provided for controlling air flow to the primary combustion zone. This primary damper operates coordinately with the fuel feed control device in response to the thermal demand of the system. A secondary damper is also provided for automatically regulating the secondary air flow in response to the CO level in the flue or stack gas.

A primary object of this invention is to reduce air pollution by reducing $NO_x$, CO, hydrocarbon and particulate content of the exhaust gases from carbonaceous and hydrocarbon fuel burners.

A further object of this invention is to provide a combustion system and method in which combustion conditions are so controlled that consequential quantities of $NO_x$ are not produced, thereby obviating the need for removing any $NO_x$ from the flue gases.

A still further object is to minimize $NO_x$ production without adversely affecting the thermal efficiency of the combustion apparatus.

Another object is to provide a device for reducing air pollutants, especially $NO_x$, which device can be readily adapted to various types of boilers and other fuel burning devices as well.

How the foregoing and other more specific objects of the invention are achieved will appear in the detailed description of an illustrative embodiment of the invention which will be set forth shortly hereinafter in reference to the drawings.

DESCRIPTION OF A PREFERRED EMBODIMENT

Although the invention is applicable to various fuel burning apparatus it will be discussed for purposes of illustration in connection with a steam or hot water boiler.

Figure 1:
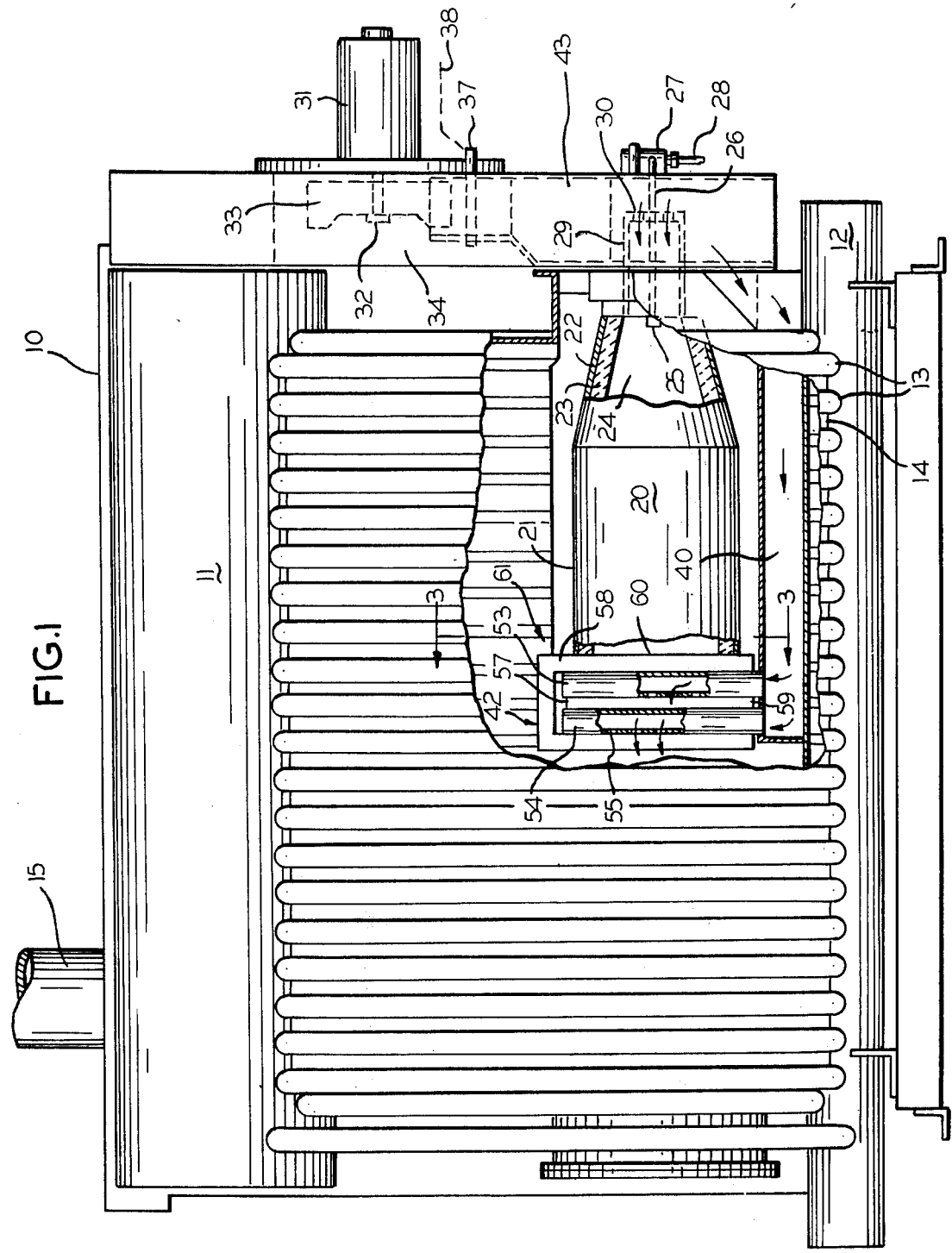
FIG. 1 is a vertical side elevation, partly in section, of a boiler incorporating the invention.
Figure 2:
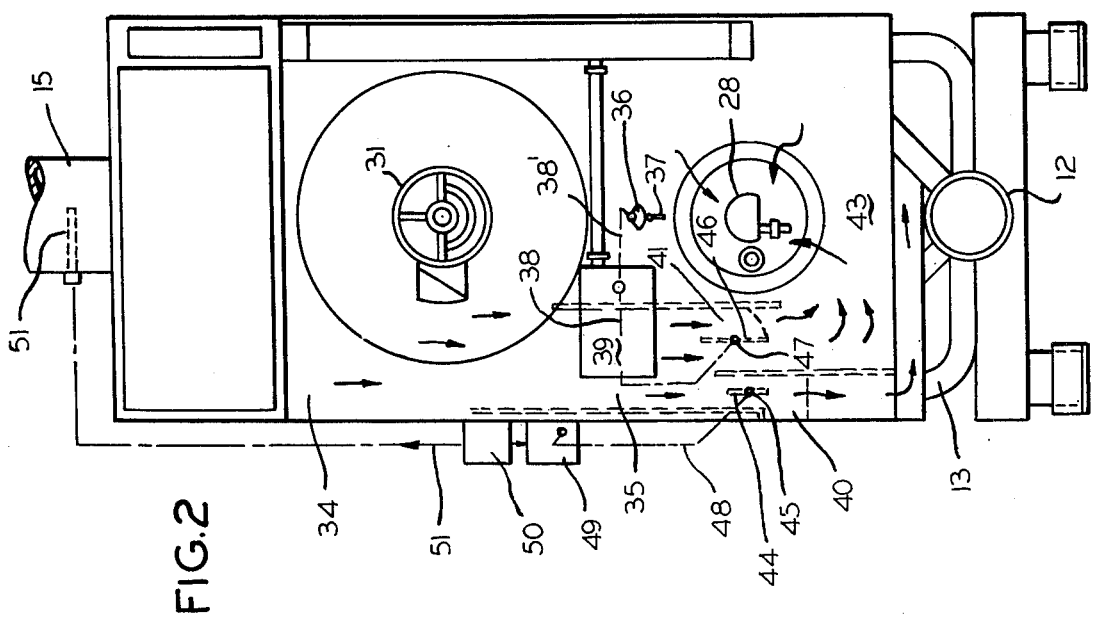
FIG. 2 is a front elevation view of the boiler shown in the preceding figure.

FIGS. 1 and 2 show a boiler which is somewhat schematically represented and which incorporates the new pollutant reduction system. The illustrative boiler comprises a housing 10 in which there is an upper steam or hot water drum 11 that connects with a lower feed water drum 12 by means of a group of water filled tubes 13. The tubes have webs 14 welded between them to enlarge the heat absorption surface and to confine the flue gases to flow in a predetermined path. There is a group of tubes 13 on the other side of the boiler also extending from upper drum 11 to lower drum 12. These tubes together with drums 11 and 12 define a space in which heat is absorbed by radiation from the combustion devices and from the hot combustion gases that flow through the boiler. Ultimately, the combustion gases reach an adapter 15 from which the gases are piped to a stack, not shown, for discharge to the atmosphere.

The boiler has a primary combustion chamber 20 comprising a cylindrical refractory shell 21 which is continuous with a conical extension 22 and which defines an internal volume 24 which is herein called a primary combustion zone. Gaseous or vaporized liquid fuel may be burned in the primary combustion zone. The fuel is injected with a nozzle 25 which has a pipe 26 leading back to a burner block 27 where a fuel line connection 28 is made thereto. Nozzle 25 is supported on its feed pipe 26 centrally within a hollow cylindrical element 29 which has a plurality of openings 30 that act as a diffuser for air which is supplied for combustion in primary combustion zone 24. The burner assembly may be any conventional type that is suitably adapted for burning gas or liquid fuel.

Supported on the front of the boiler is a motor 31 on whose shaft 32 there is mounted a fan 33. In a conventional manner, rotation of fan 33 causes generation of pressurized air in a compartment 34. The pressurized air is supplied both to the primary combustion zone 24 and to a secondary combustion zone 61 and, in some designs in accordance with the invention, to a tertiary combustion zone, not shown, as will be explained shortly hereinafter.

In the depicted embodiment, there is a main duct 35 directing combustion air to two subdividing ducts, a primary combustion air duct 41 and a secondary combustion air duct 40. Primary air duct 41 has a damper 46 mounted in it for rotation on a shaft 47. Damper 46 may be turned to regulate air flow through primary air duct 41. Shaft 47 is driven by a motor 39 as indicated by the dashed line 38. Also driven by motor 39, as indicated by the dashed line 38′, is a cam 36 whose follower 37 operates a fuel flow control valve, not shown. By conventional means which are not shown, motor 39 is driven bidirectionally to operate damper 46 and control primary combustion air flow in response to boiler operating conditions including steam or hot water load demand. Thus, damper 46 and fuel control cam 36 are operated coordinately to maintain the desired fuel-to-air ratio in the primary combustion zone 24 throughout the entire range of boiler operating conditions. In accordance with the invention, less than the amount of air for complete combustion is normally supplied to primary combustion zone 24.

In general, from about 75% to 80% of the air delivered by the fan 33 is furnished to the primary combustion zone 24 and the balance is furnished to the secondary combustion device 42 which is in secondary zone 61. Primary air duct 41 leads to a compartment 43 from which air flows through diffuser ports 30 into primary combustion zone 24 where the air enables the fuel injected by nozzle 25 to be burned incompletely, in accordance with the invention, by suitably predetermining the fuel-to-air ratio throughout the operating range of the boiler.

The smaller secondary air duct 40 has a damper 44 in it which is mounted for rotation on a shaft 45. Shaft 45 is turnable bidirectionally by a motor 49 in response to a condition such as the CO level which prevails in the flue gas stack 15 leading from the boiler. Motor 49 is controlled by a servo-controller 50 which in turn responds to CO level in the stack as sensed by a suitable sensor 51. Changes in CO level result in secondary damper 44 altering the amount of air delivered to the secondary combustion device 42 by way of duct 40.

In one operating mode the secondary air damper 44 may be wide open when the boiler is being started. This results in substantially complete combustion in the secondary zone 61 of the residual carbonaceous solids, other particular matter, hydrocarbons and CO which are not completely oxidized in the primary combustion zone 24. Then the small damper 44 may be gradually closed until CO is sensed in the stack gas. The system then goes on automatic operation to maintain the CO level near zero or below a preset minimum substantially by controlling secondary combustion air flow through regulation of damper 44. The primary combustion air flow is, during normal operation of the boiler, regulated coordinately with the proper fuel ratio in accordance with the thermal load on the boiler and on other conditions.

The total amount of air supplied for combustion in the primary and secondary combustion zones is generally slightly greater than the stoichiometric requirements for complete combustion of the combustible components of the fuel, but it will be understood that stoichiometric combustion conditions are not approached in the primary zone 24, in accordance with the invention, because gas temperature in the primary zone under these conditions could reach 2700° F and cause much $NO_x$ to be produced which is contrary to the invention. For the purposes of the invention, the boiler is operated so that gases in the primary combustion zone are maintained well below 2700° F and some incompletely oxidized products result.

In an alternative form of the invention, a main damper, not shown, is installed in main duct 35 preceding the ducts 40 and 41. This main damper may be driven by motor 39 which also drives fuel control cam 36 and damper 46 in response to boiler demands as in the illustrated embodiment. The smaller secondary air control damper 45 is then used for fine control in response to CO level in the stack gas. Control over the composition of the effluent combustion products may also be achieved with another alternative in which the main damper, not shown, in main duct 35 and the fuel control cam 36 are controlled by motor 39 in response to demand on the boiler while the primary damper 46 in duct 41 and secondary damper 45 in duct 40 are jointly controlled by CO level responsive motor 49.

Figure 4:
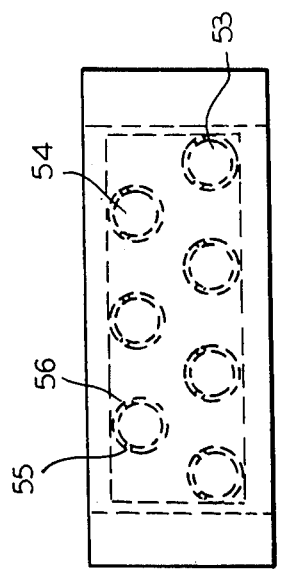
FIG. 4 is a top view of the secondary burner assembly shown in the preceding figure.
Figure 3:
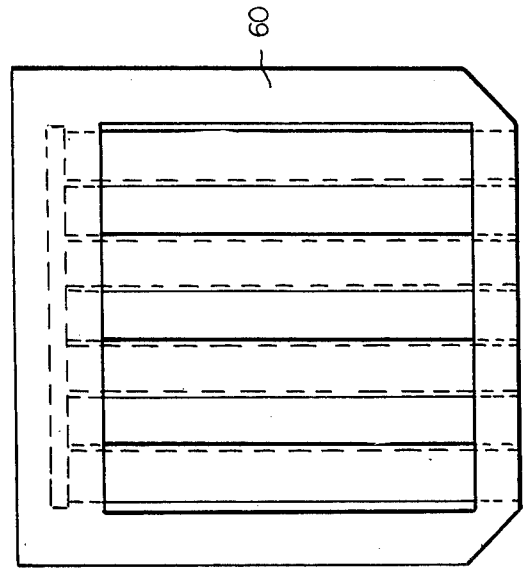
FIG. 3 is a front elevation view of the secondary burner as viewed in the direction of the arrows 3—3 in FIG. 1.

Attention is now invited to FIGS. 1, 3 and 4 for a more detailed description of the new secondary combustion device 42. As indicated heretofore, the secondary combustion device is situated in a secondary combustion zone 61 at the outlet end of the primary combustion chamber 20 so that all gases of combustion must flow through or near the device 42. Basically, the secondary combustion device 42 comprises two parallel rows of foraminous tubes, the tubes in one row being marked 54 and the tubes in the other row being marked 53. The purpose of the tubes is to diffuse or inject secondary combustion air uniformly into the stream of gaseous combustion products flowing from primary combustion chamber 20 to promote mixing and insure complete combustion without an excessive amount of secondary air. Thus, in this embodiment, a tube such as 54 is provided with two longitudinally extending rows of small holes 55 and 56 through which air may emerge into the gaseous combustion product stream. In this case, the tubes are supported in a header 57 over which there is a cap 58 to prevent evolution of undispersed air from the ends of the tubes into the gas stream. The lower ends of the tubes are also in a header 59 but the lower ends of the tubes communicate with the secondary air duct 40 which is under control of small damper 44. Air evolving from tubes 53 and 54 through the rows of small holes 55 and 56 effectuates combustion of CO and unburned substances such as hydrocarbons emanating from the primary combustion chamber. The tubes are mounted in a supporting structure 60 which maintains their position in the gaseous combustion product stream. The temperature in the secondary combustion zone is dependent upon the temperature and quantity of air discharged from tubes 53 and 54 and the radiation of heat away from this zone. The boiler tubes to which the secondary combustion device 42 is exposed insures that the secondary combustion occurs at a temperature of 2500° F or below which is low enough to minimize oxidizing nitrogen from the fuel or the combustion air to nitrogen oxides. In this embodiment, tubes 53 and 54 may be comprised of a suitable refractory or stainless steel or other material which will not degrade at prevailing temperatures. It is desirable to locate and arrange the secondary combustion device 42 in such manner that it can radiate heat to the boiler tubes so that the secondary combustion air flowing through the perforated tubes will not be significantly preheated before it emerges.

In FIG. 4, the rows of holes 55 and 56 are circumferentially spaced apart so as to intercept a central angle of about 120°. It will be understood that the rows of holes may be angularly closer or farther from each other as well without defeating the purposes of the invention. An angle of about 120° is, however, desirable since it enhances turbulence and mixing of the injected air and stream of gaseous combustion products in which case more complete combustion is promoted. With this angle, turbulence and good mixing are obtained because the air emitted from the small holes at just about the point where the gas stream flowing past the tubes begins to separate therefrom to form vortices.

Various kinds of hollow air dispersing means may be substituted for the perforated metal tubes 53 and 54 which were described. For instance, the hollow means may be made of sintered metal or ceramic or other refractory which is perforated or porous partially or entirely around their perimeters. The means may also be provided with narrow continuous or interrupted longitudinal slots for emitting air instead of being provided with many small holes or pores. The tubes may be made of any material that withstands the conditions that prevail in the vicinity of the secondary combustion device, 42. There may also be more or fewer air supply tubes in a row or more or fewer than the two rows illustrated depending upon requirements of the system.

Figure 6:
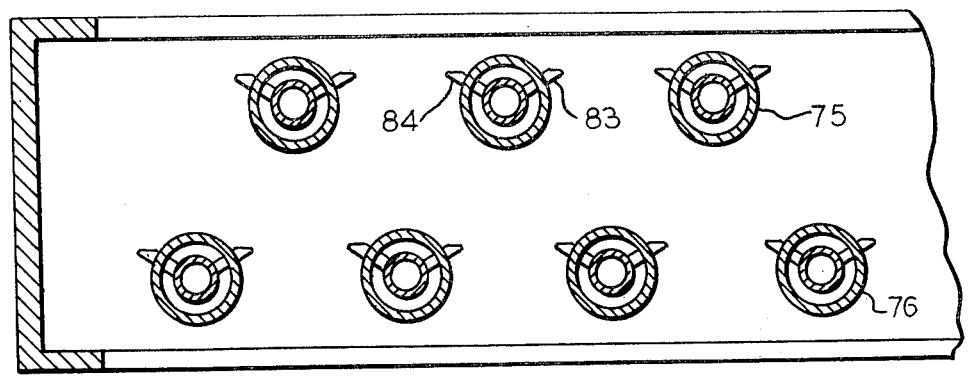
FIG. 6 is a transverse section taken on the line 6—6 in FIG. 5.

A modified form of secondary combustion device will now be described in reference to FIGS. 5–7. This embodiment is distinguished by its having means for keeping the air emitting tubes cool and for precooling or, at least preventing, preheating of the incoming secondary air.

Figure 5:
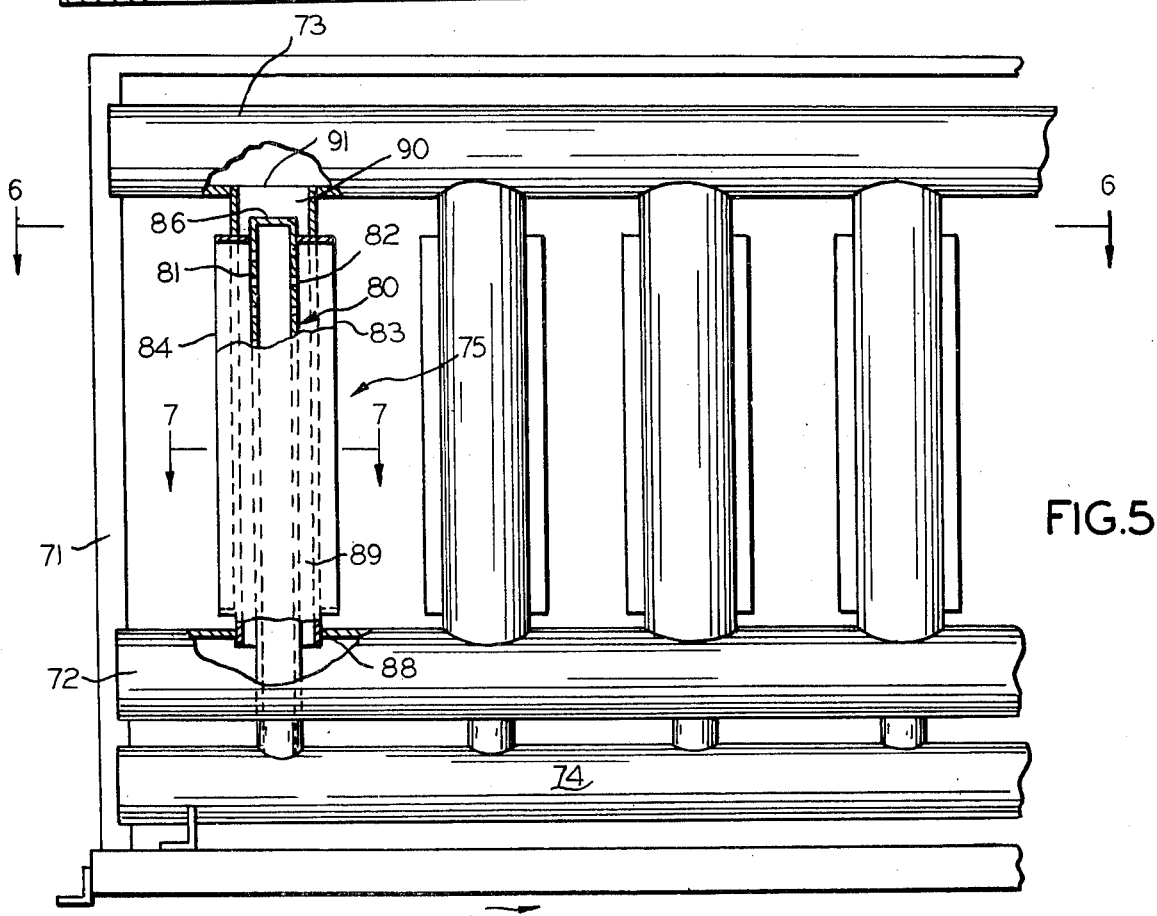
FIG. 5 is a front elevation view of an alternative type of secondary burner, with some parts broken away and in section.

In FIG. 5, the modified secondary combustion device is generally designated by the reference numeral 70. It comprises a frame 71 which supports a water feed header 72 and a water discharge header 73. Beneath the lower water header 72 is a secondary air feed header 74 that is supplied through secondary air duct 40 under the control of damper 44. As can be seen in FIG. 6, in this exemplary embodiment there are again two rows of water cooled, air emitting tube structures, the structures in the back row being marked 75 and those in the front row 76. As in the previous embodiment, it will be understood that the number of tube structures in each of the rows and their size and geometry will depend on the gas quantities handled in a particular boiler size.

One of the air emitting tube structures 75 will be described since they may all be the same. Referring to FIG. 5, one may see that the structure 75 comprises a central secondary air conducting tube 80 which has two longitudinally extending rows of small holes such as 81 and 82 through which secondary combustion air may emerge into the gaseous combustion products stream. As can be seen particularly well in the cross sectional view of one of the tube structures 75 in FIG. 7, the rows of holes 81 and 82 are aligned with angularly diverging longitudinally disposed hollow flutes 83 and 84, respectively. Both flutes have the same geometry. For instance, flute 84 extends radially from tube 80 and has a longitudinally extending open ended slot 85 which conducts the secondary air emitted through the row of holes 82 to the gaseous combustion product stream surrounding the secondary combustion device. As can be seen in FIG. 7, the tips of the slotted flutes are beveled so that the slots 85 open substantially exclusively on the leeward side of gaseous combustion product flow.

The center tube 80 in this embodiment is capped at its upper end 86 so as to constrain all of secondary combustion air to flow through the orifices or small holes 81 and 82. The lower ends of center tubes 80 are connected with header 74 through which secondary combustion air is supplied through duct 40 under the control of small damper 45. The inner tube is surrounded by a concentric outer tube 87 which defines a water jacket 89 around the inner tube. Water flows axially in the segments of the jacket between the flutes 83 and 84. This results from the fact that the lower end 88 of outer tube 87 connects into water feed head 72 as is particularly evident in FIG. 5 in the lower broken away portion of the tube structure. The inner and outer tubes are suitably welded or otherwise sealed where they pass through or into their respective headers. Water flowing axially through the water jacket area 89 emerges at the top end of the structure and continues its flow path through a cavity 90 and through a hole 91 in upper water exit header 73. Of course, the inner air tube 80 may be adapted to extend through upper water exit header 73 to another secondary air header, not shown, or the air inlet header may be arranged to feed the tubes 80 from the top instead of the bottom or there may even be two independent air headers feed tubes from the top and bottom. The design will depend on the quantity of primary gaseous combustion products to be burned and upon meeting the condition that secondary combustion should be well below 2700° F such as at about 2100° F to oxidize the CO and hydrocarbons completely and yet inhibit $NO_x$ production.

Figure 7:
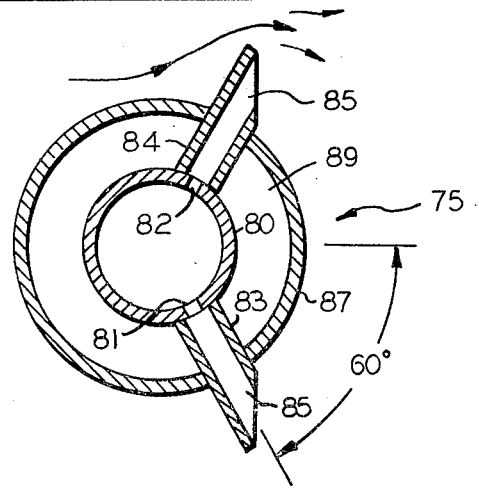
FIG. 7 is a section of one of the burner tube assemblies taken on the line 7—7 in FIG. 5.

In FIG. 7, an incremental filament of the gaseous combustion product stream is indicated by the arrowed line 95. It will be noted that this typical incremental stream deflects off of the periphery of the outer tube 87 at an angle such that the stream will intersect with the secondary air stream emerging from the slotted flutes 83, 84 in which case turbulence is maximized. This promotes oxidation of the residual hydrocarbons and carbon monoxide and any other burnable matter in the gaseous combustion product stream from the primary combustion chamber 20. The fact that the tube structure is water cooled not only prevents its thermal degradation but it also results in precooling of the incoming secondary combustion air which aids in suppressing the temperature of the secondary combustion products to well below the 2700° F at which nitrogen oxide might be formed. It is also desirable to position the secondary combustion device in relation to the heat absorbing surfaces of the boiler such that the device will be cooled by radiating to the surfaces. The existence of a fairly high CO level in the secondary combustion gases also tends to inhibit formation of nitrogen oxide because the air reacts preferentially with the carbon monoxide rather than with the nitrogen derived from the air or the fuel.

In the previously described embodiments, there are primary and secondary combustion zones. For example, in the secondary combustion device 42 shown in FIGS. 1, 3 and 4 the rows of foraminous tubular elements 53 and 54 are both supplied from the same secondary air duct 40 in which case there is actually a single secondary combustion zone in the vicinity of device 42. Similarly, in the FIGS. 5–7 embodiment, the foraminous tubes such as 80 are all connected into a common header 74 which is supplied from the secondary air duct 40 in which case all of the tubes contribute air to a single secondary combustion region. Although specific structure is not shown, those skilled in the art may readily infer from what has been disclosed that a tertiary combustion zone may also be provided. This can be done by connecting the leading rows of tube structures 54 or 75 in the FIG. 1 or FIG. 6 embodiments, respectively, to one secondary air supply. The other rows of tubes 53 or 76 in the respective embodiments, may then be connected into a third pressurized air supply, not shown. Thus, primary, secondary and tertiary combustion zones are created. The zone ahead of the rows of tubes 53 or 76 becomes the secondary zone and the zone in front of the rows of tubes 54 or 75 become the tertiary combustion zone. In this arrangement, the gaseous combustion products which are rich in CO and unburned hydrocarbons from primary combustion chamber 20 undergo further burning in two stages in the secondary and tertiary combustion zones so that the probability of elevating the gas temperature to that above which $NO_x$ might be formed is further reduced. In this arrangement, it is easier to keep the tubes cool since the flame surrounding each of the rows is not as intense.

During operation of the illustrated embodiment, changes in the CO level of the effluent stack gas are sensed and used to control the small damper 44 in the secondary air supply duct 40. If CO in the stack increases, secondary air is increased by automatic increased opening of damper 44 in which case the combustion products from the primary zone are more effectively oxidized in the secondary zone and the CO level goes down again. A decrease in stack gas CO level brings about converse action. The essence of the system is to assure that gases passing through the secondary combustion device are oxidized but to minimize the intensity of flame in that region so that the temperature will not be increased to the point where nitrogen oxides would be produced. Usually, the CO level of the stack gases will reach a steady state as long as load requirements on the boiler are fairly constant. However, if there is greater or lesser load, the fuel and air to the primary combustion zone change accordingly in which case the CO level in the flue gases may change and effectuate automatic readjustment of the secondary air.

Although embodiments of the invention have been described in considerable detail, such description is to be considered illustrative rather than limiting for the invention may be variously embodied and is to be limited only by interpretation of the claims which follow.

We claim:

1. Apparatus for dispersing combustion supporting gas into the gaseous combustion product stream within a combustion zone of a fuel burning device, said apparatus comprising:
   a plurality of elongate, hollow tubular means, means supporting said tubular means in a position generally transverse to and extending across said combustion zone, said tubular means being spaced apart in a direction generally transverse to the flow direction of said combustion product stream for causing said stream to flow into the gaps therebetween,
   and a plurality of gas discharge openings formed in each of said tubular means for injecting combustion supporting gases into said stream.

2. The apparatus set forth in claim 1 wherein said tubular means are arranged generally in a row.

3. The apparatus set forth in claim 2 wherein said tubular means are arranged generally parallel to each other.

4. The apparatus set forth in claim 3 wherein the gaps between adjacent tubular means in said row are generally equal and the discharge openings are on the downstream sides of said tubular means.

5. The apparatus set forth in claim 1 wherein:
   a. said tubular means are arranged in rows which extend substantially transversely to the general direction of flow of said gaseous combustion products, the rows being displaced from each other in the general flow direction of the gaseous combustion products and the tubular means in each row being disposed in the path of flow between the tubular means in another row.

6. The apparatus set forth in claim 1 wherein said tubular means are arranged in rows, the rows extending substantially transversely of the general flow direction of said gaseous combustion products and the rows being displaced from each other along said direction.

7. The apparatus set forth in claim 1 wherein:
   a. said gas discharge openings are disposed longitudinally and spaced transversely of said tubular means.

8. The apparatus set forth in claim 7 wherein:
   a. said tubular means are positioned in said gaseous combustion product stream with said openings directed substantially downstream.

9. The invention set forth in claim 1 including:
   a. header means adapted for being supplied with combustion supporting gas,
   b. said plurality of tubular means being coupled with said header means for receiving gas therefrom.

10. The invention set forth in claim 1 wherein:
    a. said plurality of tubular means are arranged in groups, first and second header means adapted for being supplied with combustion supporting gas, the tubular means in one group being coupled with said first header means and the tubular means in another group being coupled with said second header means.

11. The invention set forth in claim 1 including:
    a. frame means having an opening in which said plurality of said tubular means are disposed, said frame means constraining said gaseous combustion products to flow about said tubular means.

12. Apparatus for dispersing combustion supporting gas into the gaseous combustion product stream of a fuel burning device, said apparatus comprising:
    a. a first plurality of hollow means each having a plurality of openings for dispersing said gas into said stream,
    b. a second plurality of hollow means each disposed adjacent one of said first hollow means and defining therewith a space for conducting coolant in heat exchange relationship with said first hollow means,
c. isolating means for isolating said openings from said space, and
d. means for supporting said first plurality of hollow means transversely of the flow path of said stream and in a spaced apart relation.

13. The apparatus set forth in claim 12 wherein:
a. said second hollow means comprise tubular means embracing its associated first hollow means and having an opening formed therein, said isolating means extending between the openings in the first hollow means and the tubular means to provide a gas passageway from the hollow means to said stream.

14. The apparatus set forth in claim 12 wherein:
a. said isolating means comprises nozzle means projecting from said first hollow means for dispersing said combustion supporting gas.

15. The apparatus set forth in claim 14 wherein:
a. said first hollow means comprise first elongated tubular means having said plurality of nozzle means projecting therefrom,
b. said second hollow means comprising second tubular means surrounding said first tubular means and said nozzle means projecting sealingly through said second tubular means.

16. The apparatus set forth in claim 15 wherein:
a. the exit ends of said nozzle means are directed downstream.

17. The apparatus set forth in claim 12 including:
a. header means adapted for being supplied with combustion supporting gas,
b. said first hollow means being coupled with said header means.

18. The apparatus set forth in claim 12:
a. including first header means adapted for being supplied with said combustion supporting gas, and
b. second header means adapted to be supplied with fluid coolant,
c. said first hollow means being coupled with said first header means and said second hollow means being coupled independently to said second header means.

19. The apparatus set forth in claim 12 wherein:
a. said first hollow means comprises first tubular means,
b. said second hollow means comprises second tubular means surrounding said first tubular means,
c. coolant inlet and outlet header means in substantially the same plane as said second hollow means and opposite ends thereof being coupled, respectively, with said inlet and outlet header means,
d. gas header means for conducting combustion supporting gas, said first hollow means extending sealingly through one of said inlet or outlet header means and said first hollow means being coupled with said gas header means.

20. Apparatus for dispersing combustion supporting gas into the gaseous combustion product stream of a fuel burning device, said apparatus comprising:
a. hollow means adapted to receive combustion supporting gas interiorly thereof, said hollow means having a plurality of openings for conducting the gas to the exterior thereof,
b. said hollow means being positioned in said gaseous combustion product stream with said openings directed substantially downstream, at least a part of said hollow means being arcuate in cross section and said openings are at an angle of about 120° from each other in said arcuate part and substantially on the downstream side of said hollow means.

21. Apparatus for dispersing combustion supporting gas into the gaseous combustion product stream of a fuel burning device, said apparatus comprising:
a. hollow combustion supporting gas supply means having first and second groups of nozzle means projecting therefrom for dispersing said gas into said stream, and diverging from each other at about 120°,
b. means associated with said hollow means defining a space for conducting coolant in heat exchange relationship with said hollow means.

22. The apparatus set forth in claim 21 wherein:
a. said diverging nozzle means are directed generally downstream and are equiangularly displaced from a plane directed substantially in the downstream direction.

23. Apparatus for dispersing combustion supporting gas into the gaseous combustion product stream within a combustion zone of a fuel burning device, said apparatus comprising:
a plurality of elongate, hollow tubular means, means for supporting said tubular means in a position generally transversely to and across said combustion zone, said tubular means being spaced apart in a direction generally transverse to the flow direction of said combustion product stream for causing said stream to divide into separate flow paths in the gaps between said tubular means,
and a plurality of gas discharge openings formed in the downstream side of each of said tubular means for injecting combustion supporting gases into spaced apart portions of said separate flow paths.

24. The apparatus set forth in claim 23 wherein said openings in each tubular means are arranged in longitudinal rows on the downstream side thereof and arranged symmetrically relative to the flow direction of said stream.

25. The apparatus set forth in claim 24 wherein there are a pair of elongate flute means extending axially from the downstream sides of said tubular means, said flute means being arranged symmetrically relative to the flow direction of said combustion products, one of said rows of openings being disposed in each of said flute means.

26. The apparatus set forth in claim 25 wherein said tubular means are arranged in at least a pair of rows oriented across said combustion zone, the tubular means of each row being in alignment with the gaps between the tubular means of an adjacent row.

27. The apparatus set forth in claim 25 wherein a cooling jacket means surrounds each of said tubular means, said flute means extending through said cooling jacket means.

28. The apparatus set forth in claim 27 wherein said flute means are arranged parallel to the axis of said tubular means and spaced at a central angle of approximately 120°.

29. The apparatus set forth in claim 28 wherein said tubular means are arranged in at least a pair of rows oriented across said combustion zone, the tubular means of each row being in alignment with the gaps between the tubular means of an adjacent row.

* * * * *